(12) United States Patent
Deal (10) Patent No.: US 6,442,643 B1
(45) Date of Patent: Aug. 27, 2002

(54) SYSTEM AND METHOD FOR RESOLVING DATA TRANSFER INCOMPATIBILITIES BETWEEN PCI AND NON-PCI BUSES

(75) Inventor: Eric Jonathan Deal, Austin, TX (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/409,824

(22) Filed: Sep. 30, 1999

(51) Int. Cl.$^7$ .............................................. G06F 13/38
(52) U.S. Cl. ...................... 710/315; 710/313; 710/307; 710/33; 710/34
(58) Field of Search ................................. 710/313–315, 710/312, 307, 311, 2, 3, 33, 34, 35, 61

(56) References Cited

U.S. PATENT DOCUMENTS

| | | | | |
|---|---|---|---|---|
| 5,751,975 A | * | 5/1998 | Gillespie et al. | 710/315 |
| 5,852,725 A | * | 12/1998 | Yen | 710/302 |
| 5,878,238 A | * | 3/1999 | Gan et al. | 710/315 |
| 6,081,861 A | * | 6/2000 | Kelley et al. | 710/585 |
| 6,266,723 B1 | * | 7/2001 | Ghodrat et al. | 710/313 |

* cited by examiner

Primary Examiner—Peter Wong
Assistant Examiner—Raymond N Phan
(74) Attorney, Agent, or Firm—Foley & Lardner (57) ABSTRACT

A communication system for transferring (Peripheral Component Interconnect) PCI and non-PCI data over a non-PCI bus is disclosed. The system bus is a non-PCI bus having an address bus and a data bus for communicating addresses and data. A PCI-compatible peripheral is coupled to the non-PCI bus for transmitting and receiving PCI-compatible data. A non-PCI device is also coupled to the non-PCI bus for transmitting and receiving non-PCI data. In addition, a slave device is also coupled to the non-PCI bus for receiving and transmitting non-PCI data and PCI data. A byte size control line capable of being driven by the PCI-compatible peripheral and the non-PCI device is coupled between the PCI-compatible peripheral, the non-PCI device, and the slave device for indicating whether data appearing on the data bus is from the PCI-compatible peripheral or the non-PCI device, and for indicating how many bytes on the data bus are actually valid, if the data appearing on the non-PCI bus is from the non-PCI device. A bus byte enable (BBE) driven by the PCI-compatible peripheral is also coupled between the PCI-compatible peripheral and the slave device for indicating which bytes on the data bus are valid. The slave device decodes the byte size control line, the BBE, and the address bus to accept valid bytes of PCI-compatible data and non-PCI data appearing on the data bus.

18 Claims, 5 Drawing Sheets

PCI

| Bytes 3 2 1 0 | BE[3:0] |
|---|---|
| ▓▓▓▓ | 0 0 0 0 |
| ▓▓▓□ | 0 0 0 1 |
| ▓▓□▓ | 0 0 1 0 |
| ▓▓□□ | 0 0 1 1 |
| ▓□▓▓ | 0 1 0 0 |
| ▓□▓□ | 0 1 0 1 |
| ▓□□▓ | 0 1 1 0 |
| ▓□□□ | 0 1 1 1 |
| □▓▓▓ | 1 0 0 0 |
| □▓▓□ | 1 0 0 1 |
| □▓□▓ | 1 0 1 0 |
| □▓□□ | 1 0 1 1 |
| □□▓▓ | 1 1 0 0 |
| □□▓□ | 1 1 0 1 |
| □□□▓ | 1 1 1 0 |
| □□□□ | 1 1 1 1 |

(66 indicates rows)

| BSIZE | BA [1:0] | BBE | Valid Bytes |
|---|---|---|---|
| 0 0 | 0 0 | (known size) | 0 |
| 0 0 | 0 1 | " | 1 |
| 0 0 | 1 0 | " | 2 |
| 0 0 | 1 1 | " | 3 |
| 0 1 | 1 1 | " | 0,1 |
| 0 1 | 0 x | " | 2,3 |
| 1 0 | 1 x | 1 1 1 1 | 0,1,2,3 |
| 1 0 | x x | 1 1 1 0 | 1,2,3 |
| 1 0 | x x | 1 1 0 1 | 0,2,3 |
| 1 0 | x x | 1 1 0 0 | 2,3 |
| 1 0 | x x | 1 0 1 1 | 0,1,3 |
| 1 0 | x x | 1 0 1 0 | 1,3 |
| 1 0 | x x | 1 0 0 1 | 0,3 |
| 1 0 | x x | 1 0 0 0 | 3 |
| 1 0 | x x | 0 1 1 1 | 0,1,2 |
| 1 0 | x x | 0 1 1 0 | 1,2 |
| 1 0 | x x | 0 1 0 1 | 0,2 |
| 1 0 | x x | 0 1 0 0 | 2 |
| 1 0 | x x | 0 0 1 1 | 0,1 |
| 1 0 | x x | 0 0 1 0 | 1 |
| 1 0 | x x | 0 0 0 1 | 0 |
| 1 0 | x x | 0 0 0 0 | (none) |

SYSTEM AND METHOD FOR RESOLVING DATA TRANSFER INCOMPATIBILITIES BETWEEN PCI AND NON-PCI BUSES

BACKGROUND OF THE INVENTION

1. Field of the Invention

The present invention relates, generally, to systems and methods for transferring data across different data buses, and in particular embodiments, to methods for transferring data formatted for a Peripheral Component Interconnect (PCI) data bus across a non-PCI data bus, and systems incorporating the same.

2. Description of Related Art

Modern processor-based systems often use standardized bus architectures for transferring data. For example, ASB is a bus standard developed by Advanced RISC Machines (ARM) for use with their ARM9 series of processors. ASB is typically used in low power applications such as system-on-a-chip applications. PCI is an industry standard input/output (I/O) bus specification typically used in higher-power applications such as connecting peripherals to a personal computer (PC) or workstation.

It is often useful to design processor-based systems that utilize both of these bus standards. For example, in the design of set-top boxes, an ARM processor may be used in conjunction with an ASB bus to transfer data from a peripheral to memory. However, greater connectivity may be achieved if one of the peripherals is a PCI interface. With a PCI as one of the peripherals, the set-top box can be connected to PCI-compatible peripherals such as a modem, an Ethernet controller, or some other digital data source.

Figure 1:
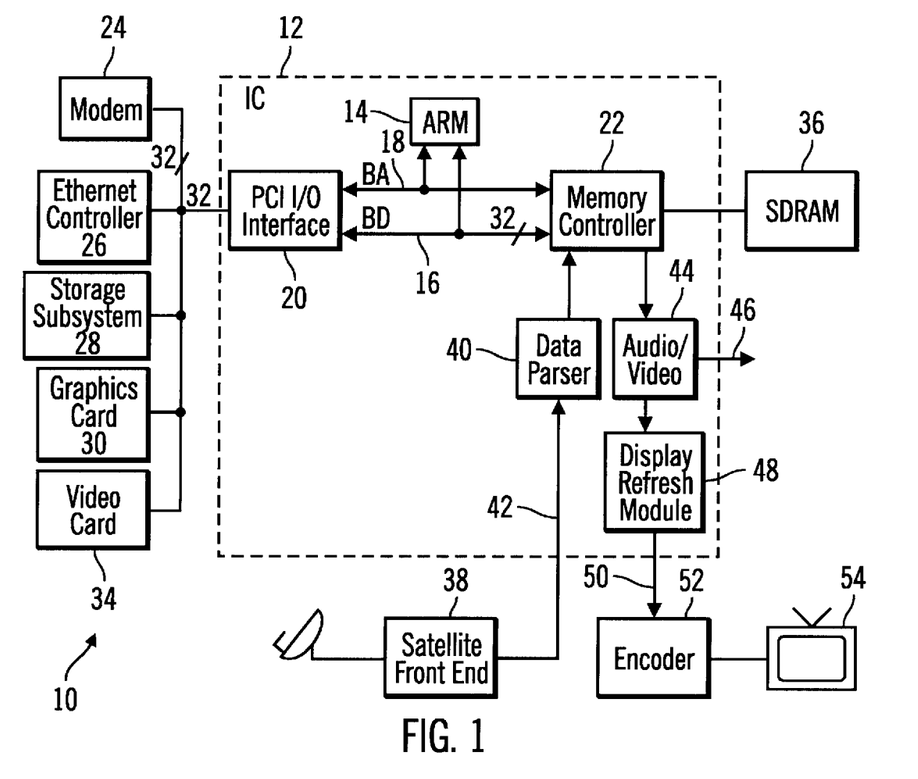
FIG. 1 is a block diagram of an example set-top box system utilizing both ASB and PCI buses.

FIG. 1 is a block diagram of an example set-top box system 10 utilizing both ASB and PCI buses. As illustrated in FIG. 1, within a primary integrated circuit (IC) 12—in essence a system on a chip—is an ARM processor 14 coupled to an ASB. The ASB is comprised of a data bus BD 16 and an address bus BA 18. Also within the IC 12 and coupled to the ASB is a PCI I/O interface 20 and a memory controller 22. The PCI I/O interface 20 may be connected off-chip to other peripherals such as modems 24, Ethernet controllers 26, storage subsystems 28, graphics cards 30, or other external devices through a PCI address/data (A/D) bus 32, which can function as both an address and data bus. The Ethernet controller 26 or modem 24 might be used for connecting to the Internet to provide the set-top box system 10 with web surfing capability.

In addition, video data may be transferred through the PCI I/O interface 20 to a video card 34 such that, rather than being a component of a set-top box system 10, the IC 12 could reside on a plug-in card for executing Motion Picture Experts Group (MPEG) audio/video decompression, with the PCI I/O interface 20 sending video data to video cards 34 in a PC system to display the images on-screen.

The memory controller 22 is coupled to off-chip synchronous dynamic random access memory (SDRAM) 36 for storing information transferred over the ASB bus.

The IC 12 may have dedicated ports for connecting to a satellite front end 38 to receive high-speed video and audio data 42. In such a configuration, a data parser 40 receives the audio and video data 42 from the satellite front end 38, parses out all the data packets, decides which data packets are to be stored, and then sends those data packets to the memory controller 22 for storing in the SDRAM 36. However, it is also possible for data received through the satellite front end 38 to enter the set-top box system 10 through the Ethernet controller 26 and PCI I/O interface 20.

An audio/video block 44 within the IC 12 retrieves data from the SDRAM 36, decompresses the data, outputs the audio data 46, and communicates the video data to a display refresh module 48. The display refresh module 48 then sends the video data 50 to an off-chip encoder 52, which converts the digital video data into NTSC or PAL format for transmission to a video display device 54.

Figure 2:
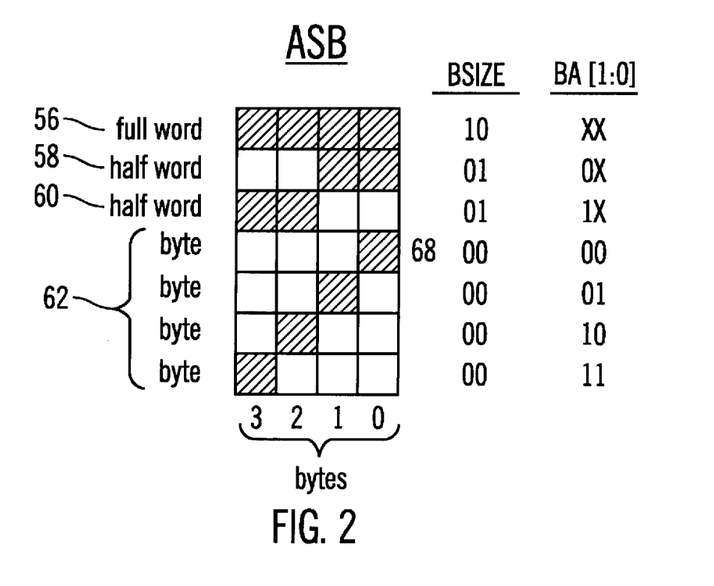
FIG. 2 is a byte map of the seven possible byte patterns natively supported by ASB.

An ASB system will now be described as an example of a non-PCI system. As noted above, the ASB is designed to operate in conjunction with the ARM processor 14, which transfers 32 bits of data (one word) at a time. However, not all of the data bits in the word may be valid. The ARM processor 14 is capable of transferring one word of valid data, 16-bits (a half-word) of valid data, or 8-bits (one byte) of valid data in contiguous memory locations. FIG. 2 is an illustration of the seven possible "byte patterns" that may be present when 32 bits of data (four bytes, denoted bytes 0–3) appear on BD 16, the shaded blocks representing valid bytes. One possible pattern is a word transfer 56, where all four bytes are valid. Another possible pattern is a half-word transfer of bytes 0–1 (reference character 58) or bytes 2–3 (reference character 60). The other possible transfer patterns are byte transfers 62, where the valid byte can be any one of the four bytes. Note that the ARM bus can only transfer data in the patterns illustrated in FIG. 2—for example, a half-word transfer can have either bytes 0–1 or bytes 2–3 valid, but it cannot have bytes 1 and 2 or bytes 0 and 3 valid.

Devices mastering the ASB must generate certain signals to describe which bytes in the transfer are valid. As illustrated in FIG. 2, one is a two-bit control signal called BSIZE, whose encodings are as follows: binary 00 means a byte transfer, binary 01 means a half-word transfer and binary 10 means a word transfer. Another signal is the two least significant bits of the address bus, BA[1:0]. BA[1:0] identifies, given a particular BSIZE, which of the four bytes in the 32-bit word being transferred are valid. It should be noted that in ASB format the address and data buses BA 18 and BD 16 are not shared because it is more efficient to have separate address and data buses, and because ASB is typically used within a chip where minimizing the number of pins is relatively unimportant.

As illustrated in FIG. 2, a BSIZE of binary 10 and a BA[1:0] of XX (X indicating don't cares) signifies that all bytes in the word being transferred are valid. For a BSIZE of binary 01, BA[1:0] can be either 0, signifying that bytes 0–1 (one half-word) are valid, or 1, signifying that bytes 2–3 (the other half-word) are valid. For a BSIZE of binary 00, BA[1:0] can be 00, signifying that byte 0 is valid, 01, signifying that byte 1 is valid, 10, signifying that byte 2 is valid, or 11, signifying that byte 3 is valid. The memory controller 22 decodes BSIZE and BA[1:0] to determine which bytes on BD are valid and should be transferred to memory.

Figure 3:
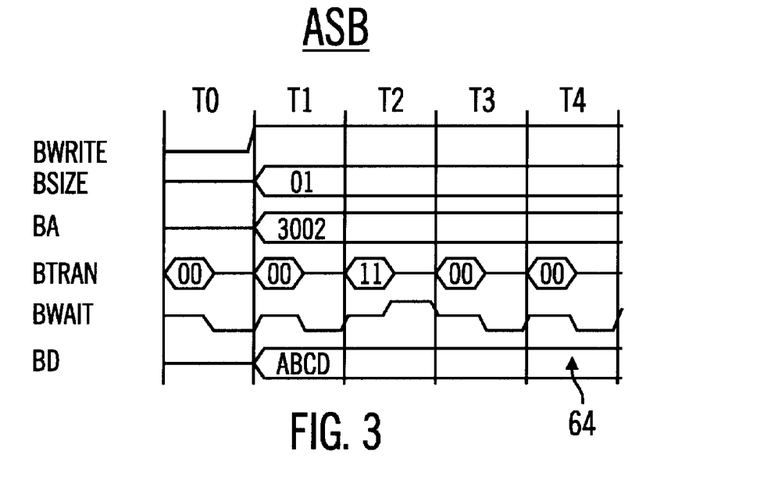
FIG. 3 is a timing diagram of a half-word write transfer in a conventional ASB system.

For purposes of illustration, FIG. 3 is a timing diagram of a half-word write transfer in a conventional ASB system. Referring to FIG. 3, BWRITE is a control signal generated by the device mastering the bus that indicates whether the operation is a read or a write. In the example of FIG. 3, a high state indicates a write operation, while a low state indicates a read operation. BSIZE, as described above, is a two-bit control signal also generated by the device mastering the bus that indicates whether the valid data being transferred is a byte, half-word, or word transfer. BA, as described above, is the 32-bit address bus. BTRAN is a 2-bit control signal, driven only during the first half of a clock cycle, that determines what kind of a transfer is on the bus. In the example of FIG. 3, binary 00 indicates no transfer (the bus is idle), a binary 11 indicates a sequential transfer, and a binary 10 indicates a non-sequential transfer. It should be noted that the ARM processor 14 does not use non-sequential transfers, which simplifies the decoding of BTRAN. BWAIT is a control signal, driven by the slave device (the memory controller 22 in FIG. 1) in response to signals from the master only during the second half of a clock cycle, that indicates whether the slave device is ready to respond or not. In the example of FIG. 3, a high state indicates that the slave device is not ready, while a low state indicates that the slave device is ready. BD, as described above, is the 32-bit data bus.

The vertical lines in FIG. 3 represent clock cycles, identified as T0–T4. During T0, when nothing is happening, BTRAN is driven to binary 00, and the slave device responds by driving BWAIT to a default low state. During T1, to initiate a half-word write transfer of bytes 2 and 3 the master drives BWRITE high, and BSIZE is driven from a high impedance (tri-state) to binary 01. BA is also driven from a high impedance to the desired address (say 3002 in this example), and four bytes of data are driven onto BD (say bytes 3-0=ABCD in this example).

During T2, BTRAN is driven to a binary 11, indicating a sequential transfer, and the slave device responds by driving BWAIT high to indicate that a wait state is needed while the slave device determines how to respond to the data transfer. During T3 the slave device responds by driving BWAIT low, indicating that the receiving device is ready to accept the transfer. During T4, for a single write (a non-burst transaction) the master drives BTRAN to binary 00, indicating an address-only transfer on the end of the current transaction. During T4, BD becomes valid and is sampled at reference character 64, and the transaction completes. Of course, because BSIZE was binary 01 and BA[1:0]=binary 10, only bytes A and B were valid and actually transferred.

A PCI bus system will now be described. As noted above, PCI allows peripheral devices to be coupled to the system through a PCI I/O interface 20. PCI provides the ability to do bus mastering, which means the peripherals themselves can initiate transfers. Because peripherals are typically external devices, minimizing the number of pins is important, so addresses and data share the same bus, the PCI A/D bus 32. The PCI A/D bus 32 is designed to operate in conjunction with peripherals capable of transferring 32-bit words (four bytes). As in ASB, not all of the data bits in the word may be valid. Unlike BD 16 in ASB, however, the PCI A/D bus 32 is capable of transferring valid data in any of 16 possible byte patterns.

Figure 4:
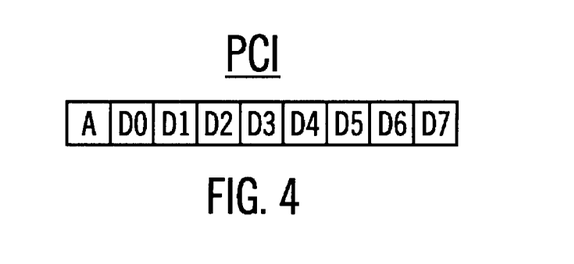
FIG. 4 is an illustration of a sequence of burst data on a PCI A/D bus.

One reason for the added flexibility of PCI is that unlike the ARM processor 14, which is designed for transfers of contiguous blocks of data, peripherals connected to the PCI A/D bus 32 may want to transfer data in mapped byte patterns. For example, a display adapter may want to update system memory (the SDRAM 36) only every fourth byte, every other byte or other interval, or in some mapped pattern. To accommodate mapped write patterns and generally enable a higher throughput on the data bus, PCI allows bursting. If the PCI A/D bus 32 is viewed as carrying a sequence of "data" as illustrated in FIG. 4, then in burst mode an address A at the beginning of the "data" sequence may be followed by contiguous words of data D0–D7, each word being 32 bits. The eight contiguous data words D0–D7 are illustrated in the expanded view of FIG. 5 as 32 contiguous bytes of data. The shaded bytes in FIG. 5 denote valid data bytes transferred by the master peripheral according to an example mapped pattern.

Figure 6:
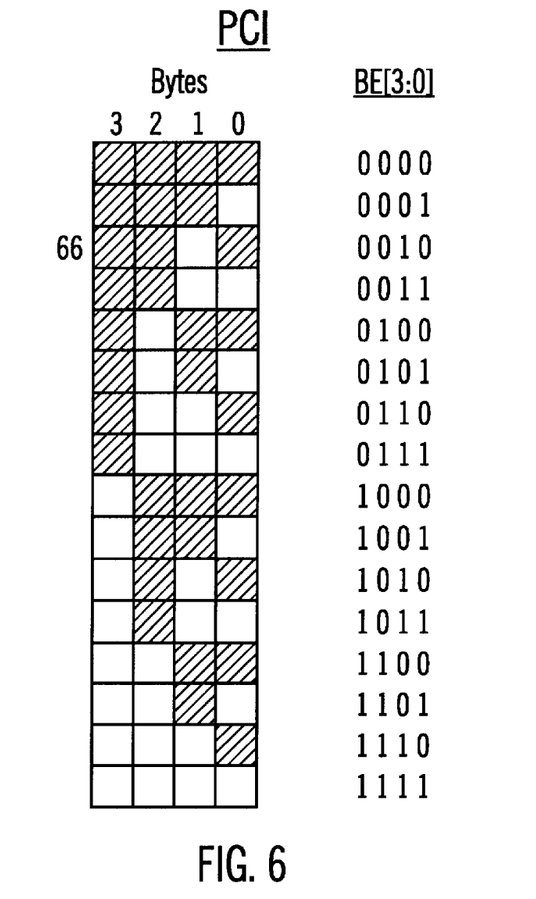
FIG. 6 is a byte map of the 16 possible byte patterns natively supported by PCI.

FIG. 6 is an illustration of the 16 possible byte patterns that may be present when four bytes (denoted bytes 0–3) appear on the PCI A/D bus 32 at any time. Peripherals mastering the PCI A/D bus 32 must generate a byte enable (BE) for each 32-bit word transferred to identify which bytes in the transfer are valid. The BE is 4-bit control signal generated concurrently with the 32-bit word being transferred and denoted BE[3:0], each bit corresponding to one of the four bytes of data being transferred. Where a byte enable bit is low, the corresponding data byte is valid. Thus, for example, if BE[3:0]=binary 1010, bytes 2 and 0 are valid. FIG. 6 illustrates the 16 possible states of BE[3:0] and their corresponding byte patterns of valid data bytes.

Figure 7:
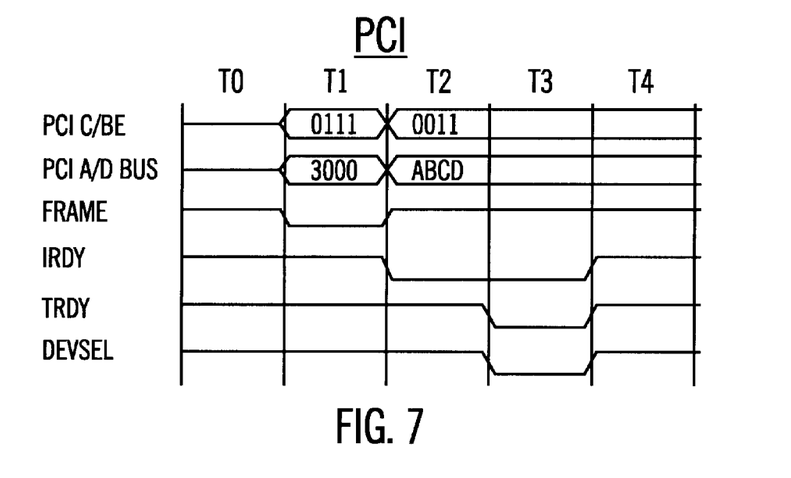
FIG. 7 is a timing diagram of a half-word write transfer in a conventional PCI system.

For purposes of illustration, FIG. 7 is a timing diagram of a half-word write transfer in a conventional PCI system. For purposes of comparison, the same data will be written to the same address as the example of FIG. 3. Referring to FIG. 7, PCI C/BE is a shared PCI command/byte enable signal and PCI A/D bus is the shared PCI A/D bus 32 described above. PCI C/BE contains a command when the PCI A/D bus contains an address, but PCI C/BE contains BE (described above) when the PCI A/D bus contains data. Both PCI C/BE and the PCI A/D bus are generated by the device mastering the bus. In addition, the master also generates FRAME and IRDY. FRAME is asserted when a data transfer is occurring. In response to IRDY, the slave device generates TRDY, and DEVSEL. TRDY indicates that the slave device is ready to actually transfer data. DEVSEL indicates that the slave device has accepted responsibility for completing the transaction.

The vertical lines in FIG. 7 represent clock cycles, identified as T0–T4. During T1, the transfer begins when the device mastering the bus drives FRAME low, drives an address (3000 in this example) onto the PCI A/D bus, and drives PCI C/BE to a binary 0111. It should be noted that in the ASB example of FIG. 3, the address bus BA contained 3002, while in this PCI example, the PCI A/D bus contains 3000. The reason for the difference is that in ASB, the two least significant bits of BA (BA[1:0]) determine which bytes are valid, and hence the "2" in "3002" is required. In contrast, for PCI the BE determines which bytes are valid, and hence only "3000" is required. In addition, the master drives PCI C/BE to a binary 0111 indicating that a write transfer is to be performed.

During T2, the master drives FRAME (11.12) high and IRDY low, indicating that data ABCD is now available on the PCI A/D bus. A byte enable of 0011 is also driven onto PCI C/BE, indicating that only bytes A and B are valid.

During T3, TRDY and DEVSEL are driven low by the slave device when the receiving device has been determined and is ready to accept the transfer. When TRDY and DEVSEL are low, bytes 3:0 of the PCI A/D bus are sampled during T3, and the transaction completes. However, because the byte enable on PCI C/BE was binary 0011, only bytes A and B were valid and actually transferred.

While ASB and PCI are both capable of transferring data in a variety of byte patterns, a comparison of FIG. 6 and FIG. 2 reveals that there are 16 possible valid byte patterns in PCI, but only seven in ASB. Thus, there are nine byte patterns in PCI that would not be recognized by ASB. Despite this inherent incompatibility, the data representations allowed by PCI must also be supported by the ASB interface to properly transfer all data received by the PCI I/O interface 20. Of course, these incompatibilities are not limited to ASB and PCI. It may be desirable to transfer PCI-compatible data across other bus standards that are incompatible with PCI.

Figure 5:
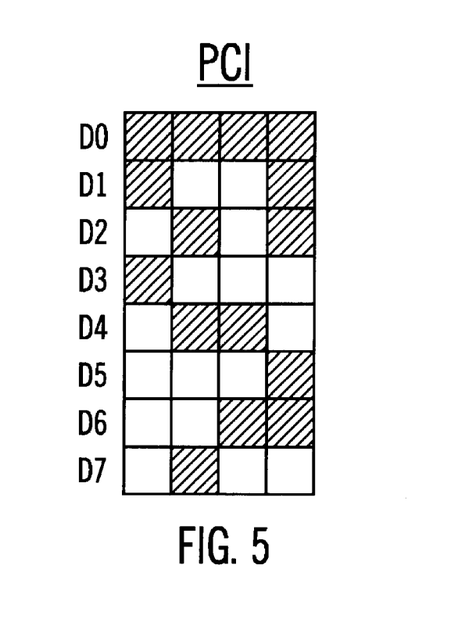
FIG. 5 is an example byte map of the eight contiguous data words D0–D7 illustrated in FIG. 4.

A PCI-compliant bridge is therefore needed to resolve the data incompatibilities between PCI and non-PCI systems to allow the non-PCI system to recognize and transfer byte patterns other than those it natively supports. In the case of ASB, for example, such a bridge would allow the ASB to transfer byte patterns other than the seven patterns it natively supports. Several solutions are currently known in the art for effecting such a bridge. One possibility would be to break a PCI data transfer into multiple transfers, each recognizable by the non-PCI system. In the case of ASB, for example, PCI byte patterns not supported by ASB such as the one identified by reference character 66 in FIG. 6 could be mapped to two separate transactions on the ASB, where a half-word transfer (see reference character 60 in FIG. 2) would be followed by a byte transfer (see reference character 68 in FIG. 2). However, such a method may become extremely inefficient for lengthy streams of ASB-incompatible byte patterns. Referring to FIG. 5 for purposes of illustration, it might take 10 or more independent transactions to get eight words of data across to the memory controller 22 if the word transfers were split into individual transfers. The added delays would create a huge bottleneck in the PCI I/O interface 20.

Another solution known in the art is to connect the PCI I/O interface 20 directly to the memory controller 22 through an independent data and address bus. In such solutions, the PCI I/O interface 20 would have two distinct interfaces—one for transfers to the PCI-incompatible device such as the ARM 14, and one for transfers to the memory controller 22. In addition, the memory controller 22 would have two distinct interfaces, one for the PCI-incompatible device, and one for the PCI I/O interface 20. These additional interfaces add physical complexity and create more arbitration within the memory controller 22.

SUMMARY OF THE DISCLOSURE

Therefore, it is an advantage of embodiments of the present invention to provide a system and method for resolving data incompatibilities between PCI and non-PCI systems that avoids the data bottlenecks that occur when PCI byte patterns are decomposed into multiple data transfers recognizable by the non-PCI system.

It is a further advantage of embodiments of the present invention to provide a system and method for resolving data incompatibilities between PCI and non-PCI systems that avoids the need for an independent address and data bus for PCI and the non-PCI system and the additional physical complexity and arbitration that accompanies such dual buses.

These and other objects are accomplished according to a system for transferring PCI data over a non-PCI bus. The non-PCI bus includes an address bus and a data bus for communicating addresses and data. A PCI-compatible peripheral is coupled to the non-PCI bus for transmitting and receiving PCI-compatible data. A non-PCI device is also coupled to the non-PCI bus for transmitting and receiving data. In addition, a slave device is also coupled to the non-PCI bus for receiving and transmitting PCI data and non-PCI data.

A control line capable of being driven by the PCI-compatible peripheral and the non-PCI device is coupled between the PCI-compatible peripheral, the non-PCI device, and the slave device for indicating whether data appearing on the data bus is from the PCI-compatible peripheral or the non-PCI device, and for indicating how many bytes on the data bus are actually valid, if the data appearing on the data bus is from the non-PCI device. A bus byte enable (BBE) driven by the PCI-compatible peripheral is also coupled between the PCI-compatible peripheral and the slave device for indicating which bytes on the data bus are valid.

The slave device decodes the control line, the BBE, and the address bus to accept valid bytes of PCI data and non-PCI data appearing on the data bus.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Modern processor-based systems often use standardized bus architectures for transferring data. For example, ASB is a bus standard developed by ARM for use with their ARM9 series of processors. ASB is typically used in low power applications such as system-on-a-chip applications. PCI is an industry standard I/O bus specification typically used in higher-power applications such as connecting peripherals to a PC or workstation.

It is often useful to design processor-based systems that utilize both of these bus standards. For example, in the design of set-top boxes, an ARM processor may be used in conjunction with an ASB to transfer data from a peripheral to memory. However, greater connectivity may be achieved if one of the peripherals is a PCI interface. With a PCI interface as one of the peripherals, the set-top box can be connected to PCI-compatible peripherals such as a modem, an Ethernet controller, or some other digital data source.

However, because of the differences between PCI and ASB in transferring data to system memory, there are nine byte patterns in PCI that are not recognized by ASB. A PCI-compliant bridge is therefore needed to resolve the data incompatibilities between PCI and ASB, essentially allowing the ASB to transfer byte patterns other than the seven patterns it natively supports.

The incompatibilities described above are not limited to PCI and ASB systems. PCI bus systems may be combined with other bus standards having similar incompatibilities. For purposes of simplifying the discussion, embodiments of the present invention described below utilize ASB as an example of a PCI-incompatible system. However, it is to be understood that other PCI-incompatible systems are covered by embodiments of the present invention.

Figure 8:
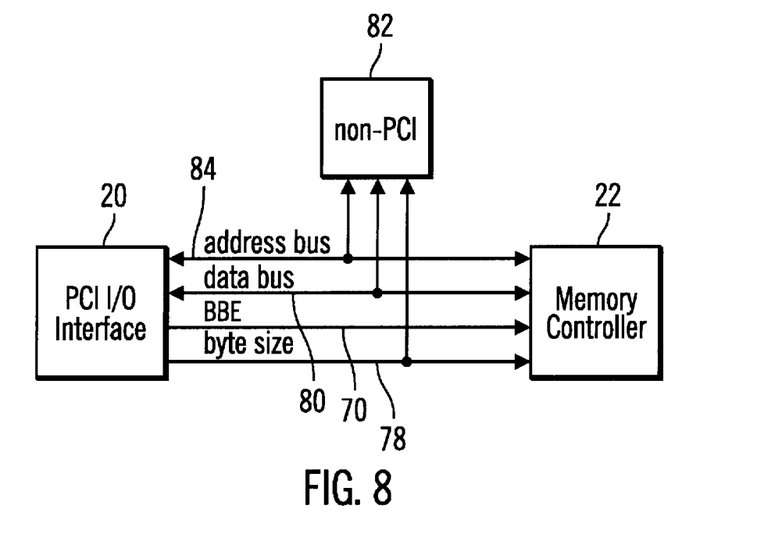
FIG. 8 is a simplified block diagram of a system capable of transferring PCI data across a non-PCI bus according to an embodiment of the present invention.

Embodiments of the present invention illustrated in the simplified block diagram of FIG. 8 resolve data incompatibilities by providing extra control signals between the PCI I/O interface 20 and the memory controller 22. The addition of these signals allows any PCI-compatible byte pattern to be transferred to the memory controller 22 without the need for additional transfer cycles, without creating a bottleneck in the PCI I/O interface 20, and without generating protocol violations on any non-PCI device. Embodiments of the present invention also add functionality to the non-PCI protocol to ensure that non-PCI data transfers can occur independent of PCI data transfers.

In embodiments of the present invention illustrated in FIG. 8, PCI data transfers are presented to the memory controller 22 as though they were full word transfers by having the PCI I/O interface 20 drive a control signal indicating byte size 78 to a state representing a full word transfer. In the ASB example, the PCI I/O interface 20 would drive BSIZE to binary 10. Ordinarily, then, all four bytes present on data bus 80 would be viewed as valid data and transferred into system memory. However, an additional control signal identified as a bus byte enable (BBE) 70 is communicated directly from the PCI I/O interface 20 to the memory controller 22 to identify which of the bytes actually contain valid data. The BBE 70 is a 4-bit signal that carries the same information as the BE of PCI. Each bit in BBE 70 is associated with one byte of data and identifies those bytes in the PCI data transfer that contain valid data. Although the BEs of PCI are active low, in preferred embodiments of the present invention the BBEs 70 are active high. Thus, in preferred embodiments, the 4-bit, active low BEs of PCI are inverted to form the 4-bit, active high BBEs 70. The BBE 70 is driven out and is valid at the same time as the data appears on the data bus 80. It should be noted that although FIG. 8 and associated text shows the memory controller 22 as the slave device, in alternative embodiments other devices capable of receiving data transfers may also be the slave device. Furthermore, alternative embodiments may also include other devices represented in FIG. 1.

If the byte size control signal 78 indicates anything other than a full word transfer, the memory controller 22 recognizes a transfer from a non-PCI device 82, and other control signals are used by the memory controller 22 to identify those bytes that contain valid data. In the ASB example, if BSIZE is anything other than binary 10, the memory controller 22 recognizes an ASB data transfer, and BSIZE and BA[1:0] are used by the memory controller 22 in the usual manner to identify those bytes that contain valid data. In addition, to ensure that data transfers from non-PCI devices 82 are distinguished from data transfers from PCI-compatible peripherals, the BBE 70 is driven to a known state whenever a non-PCI device 82 has mastered the bus. In preferred embodiments of the present invention, this known state is the "all bytes valid" state (binary 1111). In the simplified embodiment of the present invention illustrated in FIG. 8 where only the PCI I/O interface 20 and the non-PCI device 82 are coupled to the non-PCI bus, the PCI I/O interface 20 will therefore drive BBE 70 to the known state whenever the PCI I/O interface 20 has not mastered the bus. When a BBE 70 with the known state is received by the memory controller 22, the data transfer is treated like a non-PCI device 82 data transfer.

Figure 9:
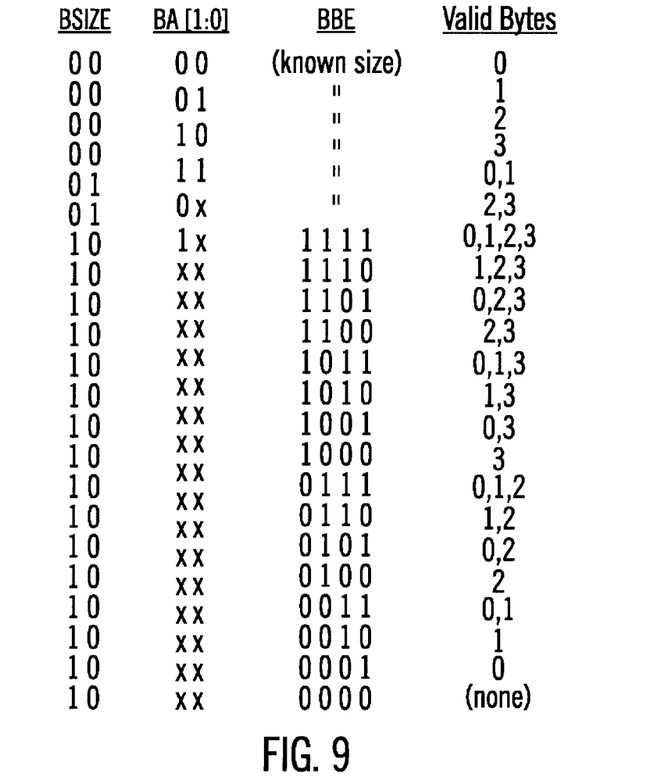
FIG. 9 is a table indicating the various possible states of BSIZE, BA[1:0], and BBE, and corresponding valid bytes according to an embodiment of the present invention that utilizes ASB as the non-PCI bus.

Thus, in one embodiment of the present invention where the non-PCI device 82 is an ARM processor and the non-PCI bus is an ASB, data transfers are governed by BSIZE, BA[1:0], and BBE. FIG. 9 is a table indicating the various possible states of BSIZE, BA[1:0], and BBE, and corresponding valid bytes.

Figure 10:
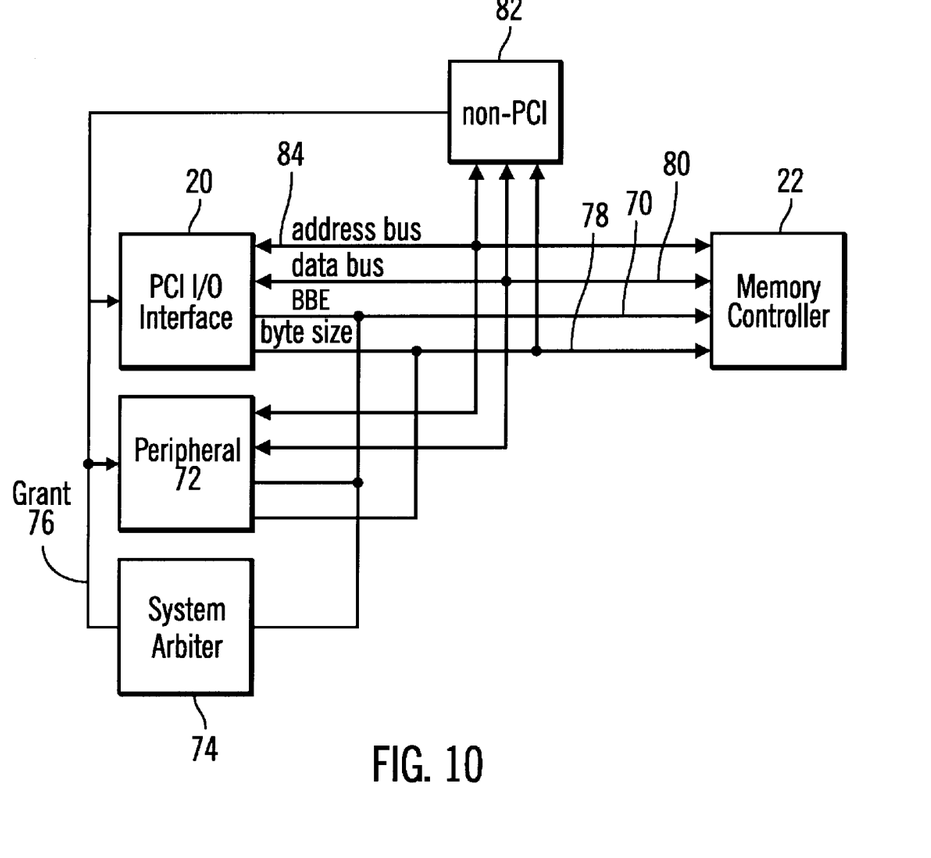
FIG. 10 is a simplified block diagram of a generic system capable of transferring PCI-formatted data across a non-PCI bus according to an embodiment of the present invention.

A more generic system according to embodiments of the present invention is illustrated in the block diagram of FIG. 10. In the system of FIG. 10, a non-PCI processor 82 is in communication with a memory controller 22 through a non-PCI address bus 84 and data bus 80. Also coupled to the ASB is a PCI I/O interface 20 and another peripheral 72. Both the PCI I/O interface 20 and the peripheral 72 are in communication with the memory controller 22 through a BBE 70.

Because the non-PCI processor 82, PCI I/O interface 20, and peripheral 72 can all initiate data transfers to the memory controller 22 through the non-PCI bus, a system arbiter 74 determines which device is mastering the bus and sends a grant signal 76 to that device. If the device mastering the bus is capable of driving out BBE 70, then that device drives out BBE 70 to the memory controller 22. However, the non-PCI processor 82 does not generate BBE 70. Thus, when the system arbiter 74 recognizes that the non-PCI processor 82 is mastering the bus, the system arbiter 74 drives BBE 70 to the known state. Stated more generally, in embodiments of the present invention the system arbiter 74 determines which devices drive BBE 70 and which devices do not, and drives the BBE 70 to the known state whenever a master incapable of driving out BBE 70 owns the bus.

In the case of a read transfer, the master still specifies which bytes it wants through the BBE 70, and the slave device (memory controller 22) returns the specified bytes. In preferred embodiments of the present invention, the memory controller 22 returns all four bytes and the master uses the BBE 70 to determine which bytes are valid.

Figure 11:
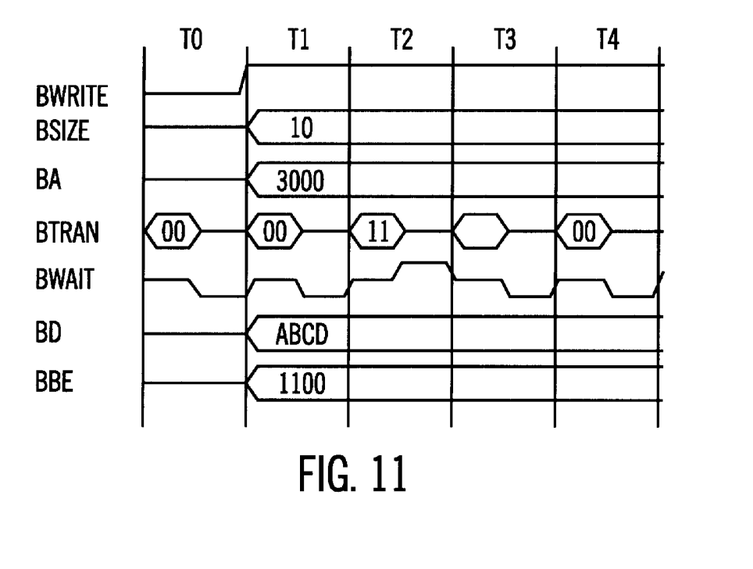
FIG. 11 is a timing diagram of a PCI half-word write transfer across an ASB system according to an embodiment of the present invention.

For purposes of illustration, FIG. 11 is a timing diagram of a PCI half-word write transfer across an ASB system according to an embodiment of the present invention. For purposes of comparison, the same data will be written to the same address as the examples of FIGS. 3 and 7. In addition to the signals illustrated in FIG. 3, FIG. 11 also contains BBE 70 as described above. The vertical lines in FIG. 11 represent clock cycles, identified as T0–T4.

During T0, when nothing is happening, BTRAN is driven to binary 00, and the slave device responds by driving BWAIT to a default low state. During T1, to initiate a half-word write transfer of bytes 2 and 3 the master drives BWRITE high, and BSIZE is driven from a high impedance (tri-state) to binary 10, indicating that this is a PCI transfer, and that BBE will be relevant. BA is also driven from a high impedance to the desired PCI address, 3000 in this example.

BBE is driven to binary 1100, indicating that only bytes 2 and 3 are valid.

During T2, BTRAN is driven to a binary 11, indicating a sequential transfer, and the slave device responds by driving BWAIT high to indicate that a wait state is needed while the slave device determines which device is to receive the data transfer. During T3 the slave device responds by driving BWAIT low, indicating that the receiving device has been located and is ready to accept the transfer. During T4, for a single write (a non-burst transaction) the master drives BTRAN to binary 00, indicating the end of the current transfer. During T4, BD becomes valid and is sampled, and the transaction completes. Of course, because BBE was binary 1100, only bytes A and B were valid and actually transferred.

Therefore, embodiments of the present invention provide a system and method for resolving data incompatibilities between PCI and non-PCI buses that avoids the data bottlenecks that occur when PCI byte patterns are decomposed into two separate non-PCI data transfers. Embodiments of the present invention also avoid the need for an independent PCI and non-PCI address and data buses and the additional physical complexity and arbitration that accompanies such dual buses.

What is claimed is:

1. A system for transferring Peripheral Component Interconnect (PCI) formatted data over a non-PCI bus, the system comprising:

a non-PCI bus comprising an address bus and a data bus for communicating addresses and data;

a Peripheral Component Interconnect (PCI) compatible peripheral coupled to the non-PCI bus for transmitting and receiving PCI-compatible data;

a slave device coupled to the non-PCI bus for receiving and transmitting PCI data and non-PCI data;

a byte size control line driven by the PCI-compatible peripheral and coupled between the PCI-compatible peripheral and the slave device for indicating whether data appearing on the non-PCI bus is from the PCI-compatible peripheral; and a bus byte enable (BBE) driven by the PCI-compatible peripheral and coupled between the PCI-compatible peripheral and the slave device for indicating which bytes on the data bus are valid;

wherein the slave device decodes the byte size control line and the BBE to accept only valid bytes of the PCI-compatible data appearing on the data bus.

2. A system as recited in claim 1, the byte size control line comprising 2-bits, the byte size control line being set to indicate that a full word is valid when the data appearing on the data bus is from the PCI-compatible peripheral.

3. A system as recited in claim 2, the BBE comprising 4-bits, each bit corresponding to a specific byte appearing on the data bus and capable of being set to an active state for indicating that the specific byte is valid or an inactive state for indicating that the specific byte is invalid.

4. A system as recited in claim 1, further including a non-PCI device coupled to the non-PCI bus for transmitting and receiving non-PCI data;

wherein the byte size control line can be set to indicate whether data appearing on the non-PCI bus is from the PCI-compatible peripheral or the non-PCI device;

wherein the BBE can be set to indicate that all bytes on the data bus are valid and the byte size control line can be set to indicate how many bytes on the data bus are actually valid, if the data appearing on the non-PCI bus is from the non-PCI device; and wherein the slave device is capable of decoding the byte size control line, the BBE, and the address bus to accept valid bytes of PCI-compatible data and non-PCI data appearing on the data bus.

5. A system as recited in claim 4, the BBE comprising 4-bits, each bit corresponding to a specific byte appearing on the data bus and capable of being set to an active state for indicating that the specific byte is valid or an inactive state for indicating that the specific byte is invalid.

6. A system as recited in claim 5, wherein the byte size control line can be set to indicate that all bytes on the data bus are valid and the BBE can be set to indicate which bytes on the data bus are actually valid if the data appearing on the non-PCI bus is from the PCI-compatible peripheral.

7. A system as recited in claim 6, the non-PCI device comprising an ARM processor.

8. A system as recited in claim 6, the non-PCI bus comprising an Advanced System Bus (ASB).

9. A system for transferring PCI-formatted data over a non-PCI bus, the system comprising:

a non-PCI bus comprising an address bus and a data bus for communicating addresses and data;

a plurality of PCI-compatible peripherals coupled to the non-PCI bus for transmitting and receiving PCI-compatible data;

a slave device coupled to the non-PCI bus for receiving and transmitting non-PCI data and PCI-compatible data;

a byte size control line driven by the plurality of PCI-compatible peripherals and coupled between the plurality of PCI-compatible peripherals and the slave device for indicating whether data appearing on the non-PCI bus is from one of the plurality of PCI-compatible peripherals;

a BBE driven by the plurality of PCI-compatible peripherals and coupled between the plurality of PCI-compatible peripherals and the slave device for indicating which bytes on the data bus are valid; and a system arbiter coupled to the plurality of PCI-compatible peripherals for identifying which of the plurality of PCI-compatible peripherals shall master the non-PCI bus and drive out the BBE;

wherein the slave device is capable of decoding the byte size control line and the BBE to accept only valid bytes of the PCI-compatible data appearing on the non-PCI bus.

10. A system as recited in claim 9, the byte size control line comprising 2-bits, the byte size control line being set to a known state when the data appearing on the data bus is from the PCI-compatible peripheral.

11. A system as recited in claim 10, the BBE comprising 4-bits, each bit corresponding to a specific byte appearing on the data bus and capable of being set to an active state for indicating that the specific byte is valid or an inactive state for indicating that the specific byte is invalid.

12. A system as recited in claim 9, further including a non-PCI device coupled to the non-PCI bus for transmitting and receiving non-PCI data;

wherein the byte size control line can be set to indicate whether data appearing on the data bus is from the PCI-compatible peripheral or the non-PCI device;

wherein the system arbiter can set the BBE to indicate that all bytes on the data bus are valid and the byte size control line can be set to indicate how many bytes on the data bus are actually valid, if the data appearing on the data bus is from the non-PCI device; and wherein the slave device decodes the byte size control line, the BBE, and the address bus to accept valid bytes of PCI-compatible data and non-PCI data appearing on the data bus.

13. A system as recited in claim 12, the BBE comprising 4-bits, each bit corresponding to a specific byte appearing on the data bus and capable of being set to an active state for indicating that the specific byte is valid or an inactive state for indicating that the specific byte is invalid.

14. A system as recited in claim 13, wherein the byte size control line can be set to indicate that all bytes on the data bus are valid and the BBE can be set to indicate how many bytes on the data bus are actually valid if the data appearing on the data bus is from the PCI-compatible peripheral.

15. A system as recited in claim 14, the non-PCI device comprising an ARM processor.

16. A system as recited in claim 14, the non-PCI bus comprising an ASB.

17. A method for transferring PCI-formatted and non-PCI-formatted data over a non-PCI bus, the method comprising:

communicating addresses and data from a PCI-compatible peripheral or a non-PCI device over a non-PCI address bus and a data bus;

making a first determination of whether data appearing on the data bus is from the PCI-compatible peripheral or the non-PCI device;

making a second determination of how many bytes of valid data are on the data bus if the first determination indicates that the data is from the non-PCI device;

making a third determination of which bytes on the data bus are valid;

accepting valid bytes of data according to the third determination if the first determination indicates that the data is from the PCI-compatible device; and accepting valid bytes of data according to the second determination and the address bus if the third determination indicates that all bytes on the data bus are valid.

18. A method as recited in claim 17, the step of accepting valid bytes of data according to the second determination and the address bus further including decoding a least significant two bits of the address bus to determine which bytes are valid.

* * * * *